(12) United States Patent
Andersen et al.

(10) Patent No.: US 8,321,860 B2
(45) Date of Patent: Nov. 27, 2012

(54) LOCAL COLLECTOR

(75) Inventors: David M. Andersen, Charlotte, NC (US); Philip L. Richards, Charlotte, NC (US); Michael J. Mayer, Charlotte, NC (US); Eric B. Hobart, Gastonia, NC (US)

(73) Assignee: Bank of America Corporation, Charlotte, NC (US)

( * ) Notice: Subject to any disclaimer, the term of this patent is extended or adjusted under 35 U.S.C. 154(b) by 902 days.

(21) Appl. No.: 12/259,080

(22) Filed: Oct. 27, 2008

(65) Prior Publication Data

US 2010/0107156 A1   Apr. 29, 2010

(51) Int. Cl.
  *G06F 17/30* (2006.01)
  *G06F 9/445* (2006.01)
  *G06F 12/16* (2006.01)
  *G06F 15/16* (2006.01)
  *G06F 7/00* (2006.01)

(52) U.S. Cl. ............... 717/178; 709/202; 707/E17.005; 707/E17.108

(58) Field of Classification Search ............. 717/178
  See application file for complete search history.

(56) References Cited

U.S. PATENT DOCUMENTS

| | | | | |
|---|---|---|---|---|
| 5,604,862 A * | 2/1997 | Midgely et al. | ............... | 714/6.1 |
| 6,829,617 B2 * | 12/2004 | Sawdon et al. | ............... | 1/1 |
| 7,069,401 B1 * | 6/2006 | Noonan et al. | ............... | 711/162 |
| 7,076,543 B1 * | 7/2006 | Kirti et al. | ............... | 709/223 |
| 7,797,752 B1 * | 9/2010 | Vaidya et al. | ............... | 726/27 |
| 8,086,694 B2 * | 12/2011 | Andersen et al. | ............... | 709/217 |
| 2004/0075677 A1 * | 4/2004 | Loyall et al. | ............... | 345/706 |
| 2004/0199555 A1 | 10/2004 | Krachman | | |
| 2004/0260876 A1 | 12/2004 | Singh et al. | | |
| 2005/0027750 A1 | 2/2005 | Martin et al. | | |
| 2005/0216788 A1 * | 9/2005 | Mani-Meitav et al. | ............... | 714/6 |
| 2006/0036676 A1 * | 2/2006 | Cardone et al. | ............... | 709/203 |
| 2006/0095795 A1 * | 5/2006 | Nakamura et al. | ............... | 713/193 |
| 2006/0218346 A1 * | 9/2006 | Nagumo et al. | ............... | 711/114 |
| 2006/0259725 A1 * | 11/2006 | Saika et al. | ............... | 711/162 |
| 2007/0005914 A1 * | 1/2007 | Thompson et al. | ............... | 711/162 |

(Continued)

OTHER PUBLICATIONS

HP OpenView Storage Data Protector Concepts Guide, Hewlett-Packard Development Company, L.P. (Published Jul. 2006), retrieved from http://h20000.www2.hp.com/bc/docs/support/SupportManual/c00751562/c00751562.pdf, on Jan. 27, 2012.*

(Continued)

*Primary Examiner* — Don Wong
*Assistant Examiner* — Theodore Hebert
(74) *Attorney, Agent, or Firm* — Michael A. Springs; Moore & Van Allen, PLLC; James C. Edwards

(57) ABSTRACT

Embodiments of the invention relate to systems, methods, and computer program products for remotely collecting data from the local storage of a machines. For example, embodiments of the method involve deploying a collection tool to the machine via a network, automatically installing the collection tool on the machine, generating a snapshot of the data, storing the snapshot in a storage area on the machine, and transmitting the data from the storage area to a remote collection server. Because the data is transmitted from the snapshot stored in the storage area rather than from the original data stored on the local storage of the machine, the data may be transmitted to the remote collection server without substantially affecting a user's ability to use the machine and interact with the data stored on the machine.

26 Claims, 2 Drawing Sheets

U.S. PATENT DOCUMENTS

| | | | |
|---|---|---|---|
| 2007/0112783 A1* | 5/2007 | McCreight et al. | 707/10 |
| 2007/0168455 A1 | 7/2007 | Sun | |
| 2007/0169078 A1* | 7/2007 | Li | 717/168 |
| 2007/0185938 A1* | 8/2007 | Prahlad et al. | 707/204 |
| 2007/0204104 A1* | 8/2007 | Wan et al. | 711/114 |
| 2008/0046260 A1* | 2/2008 | Ghielmetti et al. | 705/1 |
| 2008/0229037 A1* | 9/2008 | Bunte et al. | 711/162 |
| 2008/0263007 A1* | 10/2008 | Schmidt | 707/3 |
| 2009/0083375 A1* | 3/2009 | Chong et al. | 709/203 |
| 2009/0307333 A1* | 12/2009 | Welingkar et al. | 709/219 |
| 2010/0077160 A1* | 3/2010 | Liu et al. | 711/162 |
| 2010/0185875 A1* | 7/2010 | Mayer et al. | 713/189 |

OTHER PUBLICATIONS

Sophos Anti-Virus—Installing, updating, and using the new SUNY Oneonta anti-virus software, Information Technology Helpdesk, SUNY Oneonta (Published Jul. 24, 2003), retrieved from http://helpdesk.oneonta.edu/resnet/training/sophos.htm, on Jun. 21, 2012.*

International Search Report and the Written Opinion of the International Searching Authority mailed Dec. 10, 2009 for International Application No. PCT/US 09/62110.

Germany Patent Office. German Patent Examination Report dated Apr. 23, 2012. German Patent Application No. 1108090.0 Name of Applicant: Bank of American Corporation. English Language. 2 pages. Apr. 23, 2012.

Hewlett-Packard Development Company, L.P. "HP Open View Storage Data Protector Concepts Guide." Manual Edition: Jul. 2006. Manufacturing Part No. B6960-96001. Release A.06.00. English Language. 100 pages.

* cited by examiner

LOCAL COLLECTOR

FIELD

In general, embodiments of the invention relate to methods, systems and computer program products for electronic discovery and, more particularly, remotely collecting data from the local storage of a machine.

BACKGROUND

Companies conducting litigation face exhaustive legal discovery requests that require the collection of substantial amounts of electronic data, including user-created and/or user-modified files located on the hard drives of their employees' computers. Collecting this data is a time-consuming and labor intensive process that disrupts the employees' workday and often inconveniences those managing the collection process. Current methods require that the employee herself, or another individual on behalf of the employee, be responsible for the collection process by running certain software on the employee's computer. Because the employee will necessarily have notice of the collection, and indeed will determine when to begin the collection, the possibility exists that the employee could alter or delete the files on the computer before beginning the collection process, a practice which requires controls to reduce its frequency of occurrence.

In terms of the actual collection process, current solutions, once installed and initialized by the employee, copy files directly from the computer's local storage, uploading the resulting copies to a server to be compiled in anticipation of responding to the discovery request. During the period of copying and uploading, which can be several hours or more, the files being copied are unavailable to the employee and the processing capability of the computer and the available bandwidth are materially degraded, rendering the computer virtually unusable during the collection process. Files may also become corrupted if they are modified, opened or otherwise used while they are being collected. This period of inability to use the computer and its files not only leads to lost productivity of the employee, it also creates an obstacle for the discovery management personnel attempting to persuade employees to run the software and collect the files on their computers.

In addition, collections that are attempted over virtual private networks are inherently unreliable when using these known tools. If the network connection is interrupted, the entire process must often be restarted, adding to even greater periods of lost employee productivity. In conclusion, it is apparent that the commercial products utilized by many companies today and other known electronic discovery solutions are ill-equipped to adapt to an employee's work requirements, avoid destruction and/or corruption of discoverable data, handle interruptions, whether caused by the employee or by outages of connectivity, and operate remotely within a defined network. Therefore, there is a need for an electronic discovery system and tool that retains greater control over the collection process by operating remotely at the discretion of a manager, minimizes disruption of an employee's workday, and allows an employee to retain substantial use of her computer during collection.

SUMMARY

Embodiments of the invention relate to systems, methods, and computer program products for remotely collecting data from the local storage of a machine. For example, embodiments of the method involve deploying a collection tool to the machine via a network, automatically installing the collection tool on the machine, generating a snapshot of the data, storing the snapshot in a storage area on the machine, and transmitting the data from the storage area to a remote collection server. According to one embodiment, the collection tool is configured to generate the snapshot, store the snapshot in the storage area, and transmit the data from the storage area to the collection server. In some embodiments, the generating, storing, and transmitting operations are accomplished without substantially affecting the ability of a user to use the machine and interact with the data. In certain embodiments of the invention, the data comprises files located on the hard drive of the machine.

In some embodiments, the data may be compressed and/or hashed prior to being transmitted from the storage area to the collection server. In one embodiment, the collection tool is configured to be installed automatically on the machine. In another embodiment, transmitting the data from the storage area to the collection server comprises: determining if the machine is being actively used by a user, transmitting the data from the machine to the collection server at a first rate if it is determined that the machine is being actively used by a user, and transmitting the data from the machine to the collection server at a second rate if it is determined that the machine is not being actively used by a user, wherein the second rate is greater than the first rate.

In some embodiments, the method further includes housing in a database server a catalog of the data stored in the snapshot, and updating the catalog as the data is transmitted to the collection server to reflect the status of the data. In one embodiment, the method also includes utilizing the catalog to resume transmission of the data to the collection server at the point of interruption in the event transmission is interrupted. In another embodiment, the method includes utilizing the catalog to make a determination that the collection is complete. In some embodiments of the invention, the collection tool is also configured to determine that a particular user of the machine has used a network resource, identify the network resource used, and transmit the identification of the used network resource to a server.

According to other embodiments of the present invention, the invention is a method for collecting data from a machine, including: identifying a machine for collection, accessing the machine via a network, taking a snapshot of the data stored on the machine, storing the snapshot on the machine, and transmitting the data from the snapshot to a collection server. In one embodiment, identifying a machine for collection comprises: providing a user name and a machine name, searching the network for a machine having a name that matches the provided machine name, locating a machine having a name that matches the provided machine name, and confirming that the located machine maintains a user profile under the provided user name. In another embodiment, identifying a machine for collection comprises: providing a user name and a machine name, and employing an IP address lookup tool configured to search the network for a machine having a name that matches the provided machine name and, upon locating a machine having a name that matches the provided machine name, confirm that the located machine maintains a user profile under the provided user name.

In some embodiments, the taking, storing, and transmitting operations are accomplished without substantially affecting the ability of a user to use the machine and interact with the data. In accordance with one embodiment, accessing the machine via a network comprises the following steps: (1)

deploying a collection tool to the machine remotely via a network, and (2) installing the collection tool on the machine.

In one embodiment, the collection tool is configured to take the snapshot, store the snapshot on the machine, and transmit the data from the snapshot to the collection server. In some embodiments, the method may further comprise storing the data temporarily in a landing zone as the data is transmitted to the collection server, and transmitting the data to a network storage device after a determination is made that the collection is complete. In one embodiment, the collection server is configured to temporarily store the data in a landing zone as the data is transmitted to the collection server, and transmit the data to a network storage device after a determination is made that the collection is complete.

In some embodiments, the present invention may be a method for collecting data stored on a machine, including the following steps: (1) employing a collection tool configured to access the machine via a network, take a snapshot of the data stored on the machine, and store the snapshot on the machine, and (2) accessing the machine to transmit the data from the machine to a collection server. In one embodiment, accessing the machine to transmit the data from the machine to a collection server may be accomplished by deploying the collection tool to the machine remotely via the network, and installing the collection tool on the machine.

In other embodiments, the invention is a system for collecting data stored on a machine, the system having the following components: a collection tool configured to be deployed to the machine via a network, take a snapshot of the data, store the snapshot on the machine, and transmit the data from the snapshot; a deployment server in communication with the machine via the network and configured to deploy the collection tool to the machine; and a collection server in communication with the machine and configured to receive the data transmitted from the machine and store the data in a network storage area. In one embodiment, the collection tool is configured to take a snapshot of the data, store the snapshot on the machine, and transmit the data from the snapshot without substantially affecting the ability of a user to use the machine and interact with the data.

In some embodiments, the system also includes a case management server providing a user interface through which identifying information about the machine may be entered and the collection process may be observed and managed. In one embodiment, the deployment server and the collection server may be combined into a single server. According to some embodiments, the system may also include an IP address lookup tool configured to run on the deployment server and determine the IP address of the machine. In some embodiments, the system may further comprise a database server in communication with the deployment server, the collection server, and the machine and configured to house data transmitted by the deployment server, the collection server, and/or the collection tool.

In accordance with some embodiments of the present invention, the system also includes a landing zone configured to store temporarily and/or stage the data as the data is received by the collection server. In other embodiments, the collection tool is configured to employ a security tool configured to prevent a user of the machine from accessing or editing the snapshot. In yet another embodiment, the system also includes a network storage device configured to permanently store the data. According to some embodiments, the collection server is configured to temporarily store the data in a landing zone as the data is transmitted to the collection server, and transmit the data to a network storage device after a determination is made that the collection is complete.

In accordance with some embodiments, the invention may be a computer program product for collecting data stored on a machine, the computer program product comprising a computer readable medium having computer readable program instructions stored therein, wherein said computer readable program instructions comprise: first instructions configured for taking a snapshot of the data stored on the machine; second instructions configured for storing the snapshot on the machine; and third instructions configured for transmitting the data contained in the snapshot to a remote collection server. In one embodiment, the computer program product is configured such that the first, second and third instructions are capable of being executed without substantially affecting a user's ability to use the machine and interact with the data stored on the machine. In some embodiments the computer program product has additional instructions configured for utilizing the catalog to resume transmission of the data contained in the snapshot to the remote collection server at the point of interruption in the event transmission is interrupted.

BRIEF DESCRIPTION OF THE DRAWINGS

Figure 1:
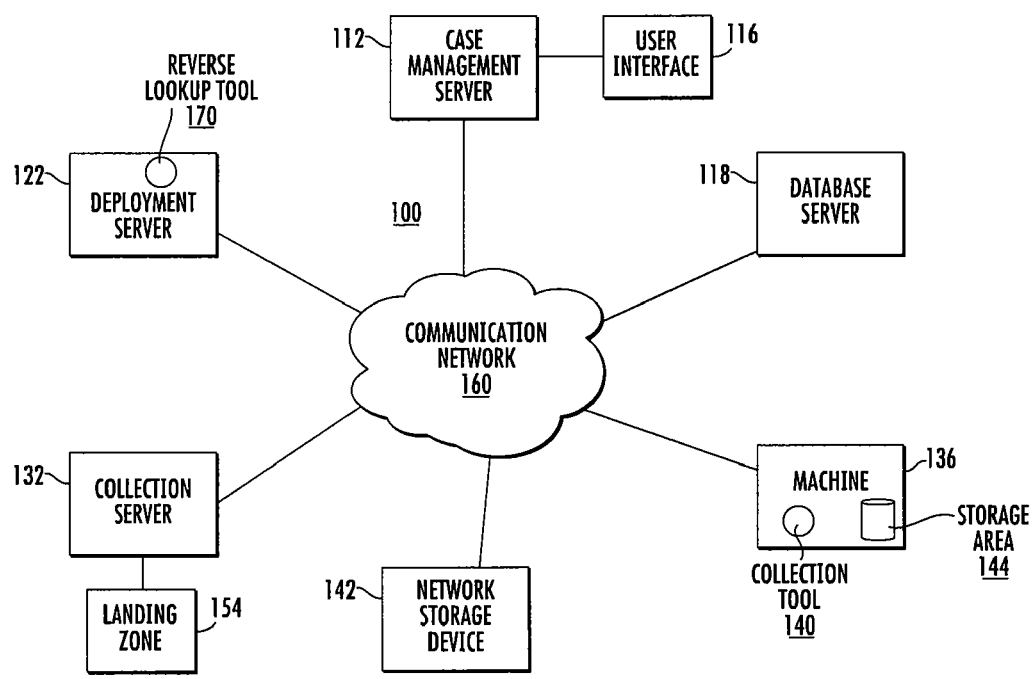
Figure 2:
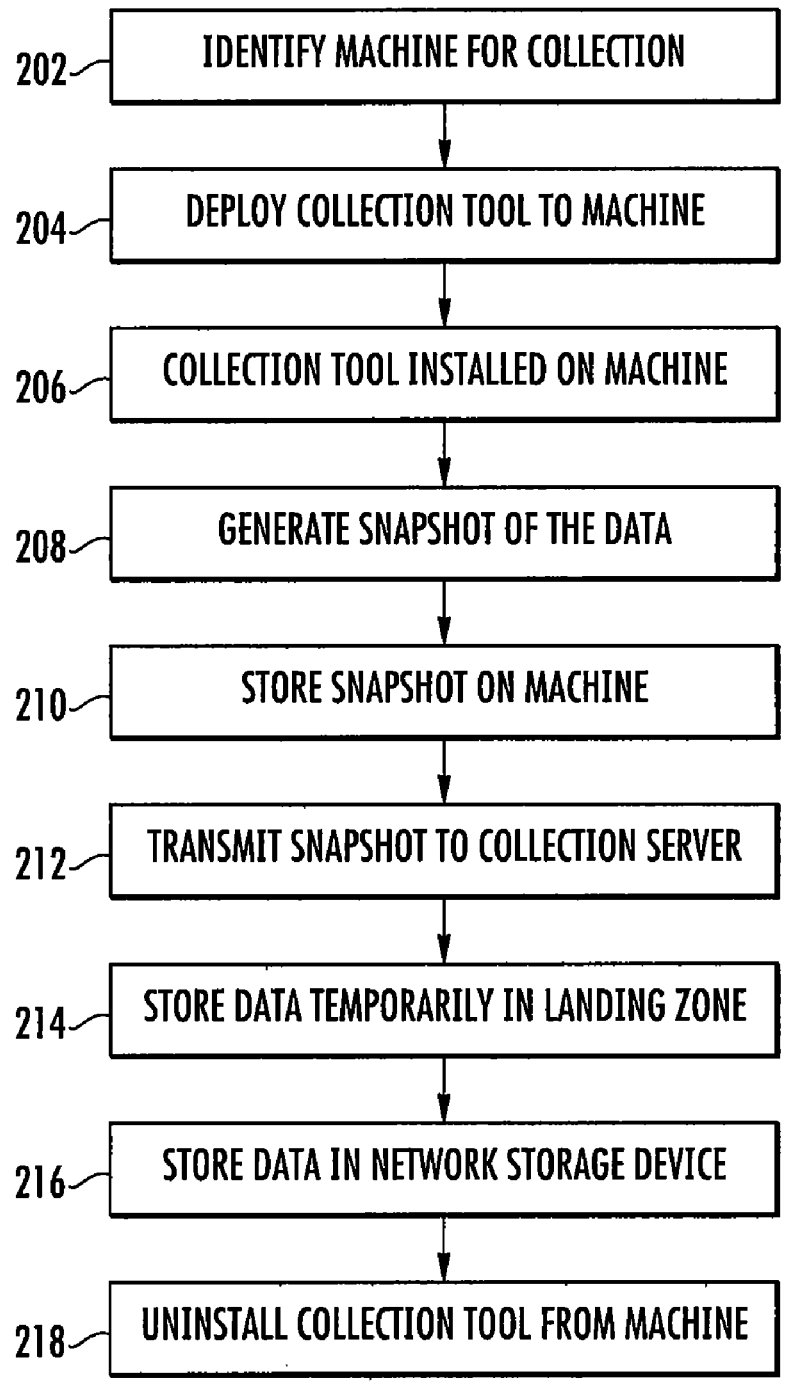

Having thus described embodiments of the invention in general terms, reference will now be made to the accompanying drawings:

FIG. 1 illustrates an environment in which the processes described herein are implemented according to one embodiment of the invention; and FIG. 2 is a flow chart illustrating an exemplary process of remotely collecting data from the local storage of a machine, in accordance with an embodiment of the invention.

DETAILED DESCRIPTION OF EMBODIMENTS OF THE INVENTION

Embodiments of the present invention now will be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art, the present invention may be embodied as a method (including a business process), system, computer program product, or a combination of the foregoing. Accordingly, the present invention may take the form of an entirely software embodiment (including firmware, resident software, micro-code, etc.) or an embodiment combining software and hardware aspects that may generally be referred to herein as a "system." Furthermore, embodiments of the present invention may take the form of a computer program product on a computer-readable medium having computer-usable program code embodied in the medium.

Any suitable computer-readable medium may be utilized. The computer-readable medium may be, for example but not limited to, an electronic, magnetic, optical, electromagnetic, infrared, or semiconductor system, apparatus, device, or propagation medium. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device; or transmission media such as those supporting the Internet or an intranet. Note that the computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Computer program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described below with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instruction means which implement the function/act specified in the flowchart and/or block diagram block(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

FIG. 1 illustrates an exemplary local collection system 100 in accordance with an embodiment of the invention. The local collection environment includes a plurality of servers and machines in communication with one another over a communication network, as would exist, for example, in a company's information technology operating environment. In particular, a case management server 112, a database server 118, a deployment server 122, a collection server 132, a network storage device 142, and at least one client machine 136 are all in communication over a communication network 160. The communication network 160 could be a wide area network, including the Internet, a local area network or intranet, a wireless network, etc. A collection tool 140 is also provided that is configured to be deployed over the communication network 160 to the machine 136. The collection tool 140 is described further herein below.

The case management server 112 provides user interface management for a user interface 116. In one particular embodiment, the case management server 112 is a web server that can be accessed by a web browser. Through the case management server 112, the user interface 116 may be presented to a user for the purposes of initializing and managing the local collection process. For illustrative purposes, it will be assumed herein that the user interacting with the user interface 116 is an employee or contractor of the company who serves a case management and electronic discovery management role, and hereafter is referred to as the "eDiscovery Manager." As discussed in detail further below, the eDiscovery Manager can utilize the user interface 116 to identify machines from which data should be collected and review the progress of those selected collections. It should be appreciated, however, that any individual could use the user interface 116 to perform the manual functions herein attributed to the eDiscovery Manager, and, indeed, that an automated process could be generated to perform those functions as well.

The case management server 112 is in communication with the database server 118, the deployment server 122, and the collection server 132. The database server 118 is configured to provide database services for the system, including housing the queue of machine names selected for collection by the eDiscovery Manager and provided to the database server 118 by the case management server 112. As discussed more generally below, the eDiscovery Manager can utilize the user interface 116 to mark a certain user and/or machine for collection. In one embodiment of the present invention, the information input by the eDiscovery Manager and transmitted to the database server 118 for housing includes a user identification, an associated machine name identifying the target machine 136 (specifically the machine name as such machine is defined in its particular domain), and an indicator indicating the particular domain of the identified machine 136. Such information could be entered in a situation where the machines marked for collection are subject to dynamic IP addressing, so as to provide the deployment server 122 with enough information to locate the target machine 136. In another embodiment of the present invention, for example in situations where IP addresses remain static, the eDiscovery Manager could simply enter the IP address of the target machine 136 and such IP address would be transmitted to the database server 118. The database server 118 houses the applicable information regarding the identification and/or location of the target machine 136, however provided by the eDiscovery Manager, and communicates with the deployment server 122 in anticipation of deployment.

The deployment server 122 is configured to deploy the collection tool 140 over the communication network 160 to the client machine 136, which is connected to the communication network 160. In some embodiments of the present invention, the deployment server 122 is configured to deploy the collection tool 140 to any of a certain number of machines that are members of a particular known domain or domains, for example, domains relating to a single company or entity. In one embodiment of the present invention, the deployment server 122 accesses the list of machines marked for collection in the database server 118. The deployment server 122 is configured to communicate with the database server 118 and inquire whether there are any machines listed in the database server 118 that are marked for collection to which the collection tool 140 has not yet been deployed. If this inquiry determines that there is a machine marked for collection that has not yet been addressed by the deployment server 122, the deployment server will deploy the collection tool 140 to the target machine 136. Alternatively, in other embodiments of the invention, the database server 118 may be configured to affirmatively request that the deployment server 122 deploy the collection tool 140 to a particular identified target machine 136. In either instance, upon deployment of the collection tool 140 by the deployment server 122, the deployment server 122 transmits confirmation to the database server 118 that the collection tool 140 has been deployed. The listing of the target machine 136 in the database server 118 is then updated to show a status of deployment in order to avoid duplicative deployments.

With regard to deployment, the collection tool 140 may be deployed to the target machine 136 if the IP address for such target machine 136 is known and the target machine 136 is connected to the communication network 160. In embodiments of the invention wherein the communication network 160 is the private network of a particular entity, the target machine 136 may be connected to the communication network 160 via a virtual private network (VPN). In the event the IP address of the target machine 136 is provided by the database server 118 initially, the collection tool 140 can be immediately deployed. On the other hand, according to embodiments of the invention operating in an environment subject to dynamic IP addressing, the deployment server 122 will first locate the target machine 136 using the information (other than IP address) provided by the database server 118 (and originating with the eDiscovery Manager). According to one embodiment, wherein the database server 118 provides the deployment server 122 with a user identification, a machine name, and an identification of the domain of the target machine 136, an IP address lookup tool 170 is provided that is configured to run on the deployment server 122 and scour the communication network 160 over the identified domain to identify the target machine 136 by bouncing the given machine name against all name resolution servers and obtaining a match. Upon identifying a machine on the network whose name and domain matches those specified by the database server 118, the IP address lookup tool 170 communicates the IP address for such identified machine to the deployment server 122 for deployment, either directly, or through the case management server 112. In one embodiment, the IP address lookup tool 170 is configured to access over the communication network 160 the machine having the IP address identified and to confirm that the name of the machine having that IP address matches the machine name originally given to the IP address lookup tool 170 to search. In the event the IP address lookup tool 170 does not find a match, the deployment server 122 relates to the database server 118 and/or the case management server 112 that deployment failed due to inability to locate the identified machine. According to different embodiments, the database server 118 may keep the machine-identifying information in its queue for another deployment attempt or make an indication in its record that deployment to the machine failed, removing that machine from its active queue. The eDiscovery Manager may also be prompted via the user interface 116 to provide additional information or investigate the failed deployment.

In some embodiments, the IP address lookup tool 170 is further configured to confirm that the located machine maintains a profile for the particular user identification provided by the database server 118. If such a profile is located, the IP address lookup tool 170 confirms that the located machine is indeed the intended target machine 136 and the collection tool 140 is deployed to the target machine 136. If such a profile cannot be found on the located machine, a message to that effect is relayed back to the case management server 112 for presentation to the eDiscovery Manager through the user interface 11 6. Furthermore, the database server 118 will maintain the identifying information about such machine until the machine is successfully located and the collection tool 140 is deployed, or until the eDiscovery Manager manually removes such machine from the queue. It should be noted that the profile-confirming function of the IP address lookup tool 170 can be employed even where an IP address is initially provided by the database server 118, in order to confirm that the machine having such an IP address has indeed been used by the user intended for collection.

With regard to the collection tool 140, the collection tool 140 is configured to access and be installed on any machine to which it is deployed by the deployment server 122, and in particular, the target machine 136. According to one embodiment, the collection tool 140 is configured to be automatically installed on the target machine 136. Such automatic installation is advantageous as it not only avoids the need for the user to be granted administrator privileges to install a program, or other intervention by a network administrator, but also avoids the delay in collection that could occur if the user of the target machine 136 was responsible for installation. According to some embodiments, the collection tool 140 is configured to generate a snapshot of the data residing on the local storage of the target machine 136, store the snapshot in a storage area 144 on the target machine 136, and transmit copies of the files contained in the snapshot to the collection server 132. By transmitting the data from the snapshot of the data stored on the hard drive of the machine 146, the collection tool 140 advantageously allows the user to continue to use the machine 136 without substantial interference from the collection tool 140 and even interact with the data stored on the hard drive as the snapshot of the data is being transmitted to the collection server 132. Utilizing the snapshot for collection also reduces the ability of a user to avoid the collection of certain data by deleting the data from the local storage of the machine 136, since any deletion of files on the machine 136 after the snapshot is taken will not affect the snapshot, and the deleted files will still be transmitted to the collection server 132 from the snapshot.

More specifically, and in accordance with some embodiments of the present invention, the collection tool 140 is configured, upon accessing and installing on the target machine 136, to present a message to the user of the target machine 136 indicating that the machine has been identified for collection and requesting that the user log off and log back on to the machine. In addition, the collection tool 140 is configured to automatically initialize when the user logs back on to the machine 136, and then to immediately and automatically generate a snapshot of all files stored on the hard drive of the machine 136. Generating the snapshot upon log-in, prior to the user being able to open, use, delete or otherwise interact with the files stored on the hard drive, ensures that the snapshot is not corrupted by files that are thereafter locked, opened or used by the user or otherwise. The snapshot may be generated by using a commercially available tool such as the Volume Shadow Copy Service offered through Microsoft Windows. The log off/log on procedure not only resets the collection tool 140, but also ensures that the snapshot encompasses the broadest scope of potential files available on the hard drive, ensures that the files are not locked at the time that the snapshot is taken, thus improving the likelihood of a complete collection without conflicts, and increases the usability of the machine 136 during the collection process. Alternatively, however, the log off/log on procedure does not need to be employed by the collection tool 140, and other embodiments of the invention may provide for automatic or manual generation of the snapshot upon installation of the collection tool 140.

After generating the snapshot of the files on the hard drive of the machine 136, the collection tool 140 is configured to store the snapshot in a storage area 144 located on the client machine 136. It is from the storage area 144 that the entire snapshot, and the files and data contained therein, will be transmitted to the collection server 132. In addition to storing the snapshot, the collection tool 140 is also configured to transmit to the database server 118 a catalog of the files contained in the snapshot. As described in greater detail below, this catalog may be referenced by the collection server 132 in order to determine whether collection is complete. Additionally, in accordance with some embodiments, the collection tool 140 is configured to compile and transmit to the case management server 112, either directly or indirectly through other servers such as the database server 118, a list of network resources the user is using, including, for example, applications or databases on the network that the user has used or accessed. This list of resources may be presented the eDiscovery Manager through the user interface 116 and can serve to guide the eDiscovery Manager in the identification of other data that should be collected. According to one embodiment, the collection tool 140 may transmit this list of network resources each time it connects to the collection server 132 following an interruption in connection.

With regard to transmission of the files themselves, according to one embodiment of the invention, the collection tool 140 is configured to compress, hash, and upload the files contained in the snapshot to the collection server 132. Compressing the files prior to transmission thereof increases the rate of transmission and therefore advantageously decreases total collection time. In addition, the bandwidth required for transmission decreases when the files being transmitted are compressed, so compressing the files also advantageously improves the user experience by not degrading network performance. Hashing the files prior to transmission thereof allows a determination to be made following transmission that the data arriving at the collection server 132 is the same data that was collected from the target machine 136 as a snapshot. It should be appreciated that one, both, or neither of the foregoing techniques may be employed by the collection tool 140 prior to transmitting the snapshot to the collection server.

In some embodiments, the collection tool 140 is also configured to determine whether a user is actively using the machine 136 while the data (in the form of individual files in the snapshot) is being transmitted to the collection server 132. According to one embodiment, if the collection tool 140 determines that a user is not actively using the machine 136, the collection tool 140 will allow the rate of transmission of the data to reach a maximum nearing the bandwidth capacity of the connection between the machine 136 and the collection server 132. With regard to making such a determination, the collection tool 140 may determine that there is no active use being made of the machine 136 by a user only after it observes a predetermined period of inactivity. On the other hand, if the collection tool 140 determines that a user is actively using the machine 136, the collection tool 140 will slow the rate of transmission of the data to free up a sufficient amount of bandwidth so that the user may engage in other activities using the machine 136 that require consumption of bandwidth. The determinations described may be made by the collection tool 140 continuously, so that the collection tool 140 is essentially monitoring active usage of the machine 136 by a user, and adjusting the rate of transmission of the data as soon it is determined that a user is actively using the machine 136 or that a user is not actively using the machine 136. According to another embodiment, the collection tool 140 could communicate its determinations to the collection server 132 as such determinations are made, and the collection server 132 could adjust the rate at which it receives the data accordingly. Either embodiment advantageously promotes the usability of the machine 136 to the user during the collection process, by providing the user with a greater amount of free bandwidth when the user may be pursuing unrelated activities, and makes the collection process more efficient, by increasing the rate of collection during periods when the user is not affected by a loss of bandwidth.

The collection server 132 is in communication with the target machine 136 and is configured to receive the files transmitted by the collection tool 140 from the storage area 144 of the target machine 136. In one embodiment, the collection server 132 deposits the files as they are received from the machine 136, into a landing zone 154 that serves as both a temporary storage area and staging area for the incoming data, where various functions could be performed on the data. The landing zone 154 could be a network storage device, such as a file server. According to another embodiment of the invention, the collection server 132 also communicates with the database server 118 in order to update the catalog stored in the database server. As each file in the snapshot is uploaded to the collection server 132 and stored temporarily in the landing zone 154, the collection server communicates to the database server 118 that the file has been collected, and that item in the catalog is marked accordingly. On the other hand, in the event a file is not successfully transmitted to the collection server 132, the collection server 132 will communicate an error message to the database server 118 and that item in the catalog will be marked as uncollected. It should be appreciated that the status of the collection of each file could be communicated to the database server 118 by alternative mechanisms, including by the collection tool 140.

Through utilizing this cataloging method, the system operates to resume interrupted collections at the point of interruption. For example, if a particular collection is interrupted due to a loss of network connectivity between the machine 136 and the collection server 136, either the collection tool 140 or the collection server 132, according to different embodiments of the invention, is configured to reach out to the database server 118 upon reestablishment of the connection. The catalog housed in the database server 118 can then be accessed to determine which files on the snapshot were successfully uploaded to the collection server 132 and which remain to be uploaded. At that point, the collection tool 140, either automatically if it is configured to independently determine the point of resumption, or upon the request of the collection server 132 if it is the collection server 132 that makes the determination, may resume transmission of the data from the snapshot to the collection server, transmitting only those files that are marked in the catalog housed by the database server 118 as uncollected.

The database server 118 also communicates with the collection server 132 and the collection tool 140 in completing the collection process. Once the collection tool 140 has attempted to transmit all files comprising to the collection server 132, and the corresponding status information has been communicated to the database server 118, each item in the catalog housed in the database server 118 should be marked as either successfully collected, which items correspond to those files temporarily stored in the landing zone 154, or unsuccessfully collected, which items correspond to those files that did not arrive at the collection server 132 for one reason or another.

Recalling that in some embodiments the database server 118 is in communication with the case management server 112, according to certain embodiments of the invention the case management server 112 is configured to display the status of the collection as known by the database server 118 to the eDiscovery Manager through the user interface 116. During collection, the catalog, or certain portions of the catalog, as well as the progress of individual file uploads and the progress of uploading the snapshot overall, may be presented to the eDiscovery Manager through the user interface 116. The eDiscovery Manager may, through the user interface, manually excuse any items in the catalog presented as unsuccessfully collected. On the other hand, the eDiscovery Manager may choose not to excuse an unsuccessfully collected file and instead request that the collection tool 140 attempt to collect that file again. Alternatively, and in accordance with another embodiment, the collection tool 140 will continually attempt to collect a file until it is successfully collected or manually excused. In addition, according to some embodiments, the collection server 132 is configured to recognize certain files that are not created by the user, and therefore not required to be collected. If the collection tool 140 attempts to collect a file of this type, but fails, the collection server 132 will automatically excuse the collection.

According to one embodiment, once all items in the catalog in the database server 118 are marked as either successfully collected, automatically excused, or manually excused, the collection server 132 determines that the collection is complete and transmits the data from the temporary storage of the landing zone 154 to the permanent storage of the network storage device 142. The collection server 132 may be in direct communication with the network storage device 142 and may directly transmit the data thereto, or may transmit the data to yet another intermediary server, or servers, that ultimately store the data in permanent storage in the network storage device 142. Upon determination by the collection server 132 that the collection is complete, the collection server 132, or another server in the system, may relay that message to the collection tool 140, which is configured to automatically uninstall from the machine 136 upon receipt of such a message. According to another embodiment, the deployment server 122 may be responsible for uninstalling or deleting the collection tool 140 from the machine 136 upon a determination by the collection server 132 that a collection is complete.

Referring now to FIG. 2, a flow chart is provided that illustrates an exemplary procedure 200 for collecting data from the local storage of a target machine 136 via a communication network 160, in accordance with an embodiment of the invention. Pursuant to a discovery request, the eDiscovery Manager will be required to collect data from certain company employees' computers. The computers may be, for example, laptops or desktops, and may be connected to the communication network 160 through a local area connection, a wireless network connection, or otherwise. The eDiscovery Manager specifies identification information for each computer from which data is to be collected in response to the discovery request. Accordingly, as represented by block 202, the exemplary procedure 200 begins with identifying a target machine 136 for collection. In this regard, the eDiscovery Manager, through the user interface 116, enters certain identification information for the target machine 136. This identification information may include, for example, the IP address of the target machine 136, the name of the machine 136 as it is defined in its particular domain, the user name of the individual to whom the particular collection is targeted, and/or the domain of which the machine 136 is a member. The identification information relating to the target machine 136 is housed by the case management server 112 in the database server 118 for access by the deployment server 122. The configuration of machine identifying information in the database server 118 may take the form of a queue of machines requiring collection.

Next, as represented by block 204, the collection tool 140 is deployed by the deployment server 122 to the target machine 136. The deployment server 122 communicates with the database server 132 to determine if deployment to a machine is required. According to one embodiment, if the deployment server 122 locates machine-identifying information in the database server 118 that it has not yet addressed, either through deployment or attempted, but failed, deployment, the deployment server 122 prepares to deploy the collection tool 140 to the machine identified. If the IP address for the target machine 136 is provided, the deployment server 122 may immediately deploy the collection tool 140 to the machine 136. If the IP address is not given, the IP address lookup tool 170 may be employed by the deployment server 122. As discussed above, the IP address lookup tool 170 uses information input by the eDiscovery Manager other than IP address to locate the target machine 136 and obtain its IP address.

Following deployment, as represented by block 206, the collection tool 140 is installed on the target machine 136. According to some embodiments, the collection tool 140 accesses and automatically installs on the target machine 136, presenting a notice to the user of its presence on the machine 136 and a request to log off and log back on to the machine. According to one embodiment, the user may immediately oblige with the request, or may opt to defer, for example if the user is engaged in an activity using the machine 136 at the time of the initial request. In the event the user defers, the user will be reminded after a predetermined period to log off and log back on in order to commence the collection process. Alternatively, the user may not be given the option of deferring and may not even be required to log off and log back on. In fact, in some embodiments the user is not even notified of the presence of the collection tool 140 or that a collection is taking place. Such covert collections advantageously prevent the user from intentionally interfering with the collection process.

The procedure continues as represented by block 208 by generating a snapshot of the data located in the local storage of the machine 136. The collection tool 136 may generate this snapshot using known techniques and/or services. Additionally, the snapshot may encompass all or a portion of the files residing on the hard drive of the user's machine 136. Next, as represented by block 210, the snapshot is stored in a storage area 144 on the machine 136. The collection tool 140 is responsible for storing the snapshot in the storage area 146 and transmitting to the database server 118 a catalog of the files included in the snapshot. The transmission of the catalog could occur prior to, concurrent with, or directly following storage of the snapshot in the storage area 144. According to some embodiments of the present invention, a security tool may be employed to prevent the user from accessing the storage area 144 or otherwise accessing or editing the snapshot.

As represented by block 212, the snapshot is transmitted to the collection server 132. According to some embodiments, the collection tool may upload the snapshot, and the files comprising the snapshot, to the collection server 132. Prior to or during transmission, the files may be compressed and/or hashed. As described above, and in some embodiments, the rate of transmission of files is slowed when it is determined that a user is actively using the machine 136 and increased when, based on a period of inactivity, it is determined that a user is not actively using the machine. In addition, as the files are uploaded from the storage area 144 to the collection server 132, the progress of transmission may be observed and related to the database server 118, and ultimately, to the user interface 116, by either the collection tool 140 or the collection server 132. Therefore, the catalog in the database server 118 is continually updated to show which files have been successfully collected, which files encountered problems during collection (and were perhaps manually excused by the eDiscovery Manager), and which files remain to be collected. This cataloging technique advantageously allows collection to resume from the point of interruption in the event the user or an outside force disrupts the transmission of files and, furthermore, avoids the inefficiencies of over-collection and under-collection that plague currently known systems. For example, such embodiments of the invention allow a user of a laptop or other mobile terminal to disconnect from the network when needed even if a collection is in progress. When the user laptop reconnects to the network 160, the collection resumes where it left off. In accordance with embodiments of the invention where the collection tool 140 operates within the machine 136 covertly, encrypted files on the machine 136 can be transmitted to the collection server 132 and decrypted with a master key by the collection server 132. This would advantageously automate decryption of files and obviate the need for the eDiscovery Manager to have access to the master key.

The collection procedure continues as represented by block 214 with storing the collected data in the landing zone 154. The collection server 132, upon receipt of the files from the machine 136 as transmitted by the collection tool 140, stores the files in the landing zone 154 and awaits a final determination that collection is complete. Through communication between the collection server and the database server 118, it is determined that collection is complete when each item in the catalog of the database server 118 has been successfully collected or manually excused by the eDiscovery Manager. Alternatively, it may be provided, either by the eDiscovery Manager or an administrator of the system, that a different status of an item in the catalog is not an impediment to a determination that collection is complete, and in that case, it could be determined that collection is complete even though not every file was collected or excused.

When the collection server 132 either makes the determination that collection is complete, or receives notification that collection is complete, in accordance with different embodiments of the present invention, the data in the landing zone 154 is finally stored in the network storage device 142, as set forth in block 216. The collection server 132 transmits the data from the temporary storage area of the landing zone 154 to the permanent storage area of the network storage device 142. This signals the end of the collection process, and as represented by block 218 and in accordance with some embodiments, the collection tool 140 is finally uninstalled from the machine 136. Alternatively, and in accordance with some embodiments of the invention, transfer of data to the permanent storage area of the network storage device 142 is not required and the collection tool 140 may be uninstalled from the machine 136 upon confirmation that all files have either been successfully collected or excused by the eDiscovery Manager.

It should be understood that when two devices are described herein as communicating over a network, the devices may be directly coupled to each other or directly coupled via one or more other network devices. Furthermore, although numerous servers are described above, said servers need not be separate devices and may, in some embodiments, be combined into one or more devices that perform the functions of multiple servers. It should also be appreciated that, in some embodiments, the servers are all maintained by the company whose employees and client machines are subject to the electronic discovery request, while in other embodiments, a second separate company may perform the electronic discovery process described herein for the first company. For example, in one embodiment, the network storage device 142 and the employee machine 136 are owned or monitored by a first company and the case management server 112, database server 118, deployment server 122, and collection server 132 are owned or monitored by a second company that provides an eDiscovery management service for the first company.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

The invention claimed is:

1. A method for collecting data stored on a computing device, the method comprising:
    deploying a collection tool to the computing device via a network;
    installing the collection tool on the computing device;
    in response to installing the collection tool on the computing device, generating a snapshot of the data;
    storing the snapshot in a storage area on the computing device;
    generating a catalog that lists the data included in the snapshot and communicating the catalog to a database server;
    continuously determining if the computing device is being actively used by a user throughout a transmission of data from the storage area to a collection server;
    transmitting the data from the storage area to the collection server at a first rate if it is determined that the computing device is being actively used by a user;
    transmitting the data from the storage area to the collection server at a second rate if it is determined that the computing device is not being actively used by a user, wherein the second rate is greater than the first rate;
    determining that collection of the data is complete by verifying that data in the catalog has been marked as either collected or manually excused from collection;
    transmitting a collection complete message to the computing device; and
    in response to receiving the collection complete message, automatically uninstalling the collection tool from the computing device.

2. The method of claim 1, wherein the collection tool is configured to generate the snapshot, store the snapshot in the storage area, and transmit the data from the storage area to the collection server.

3. The method of claim 1, wherein said generating, storing, and transmitting operations are accomplished without substantially affecting an ability of a user to use the computing device and interact with the data.

4. The method of claim 1, wherein the data comprises at least one file located on a hard drive of the computing device.

5. The method of claim 1, further comprising compressing and hashing the data prior to transmitting the data from the storage area to the collection server.

6. The method of claim 1, wherein the collection tool is configured to be installed automatically on the computing device.

7. The method of claim 1, wherein generating the snapshot of the data further comprises:
in response to installing the collection tool on the computing device, prompting a user of the computer device that data collection is required and requesting that the user re-boot the computing device; and
in response to re-booting the computing device, generating the snapshot of the data.

8. The method of claim 1, further comprising
updating the catalog in the database server based on a file being successfully received by the collection server to reflect a collection status of the data.

9. The method of claim 8, further comprising:
utilizing the catalog to resume transmission of the data to the collection server at a point of interruption in an event transmission is interrupted.

10. The method of claim 1, wherein the collection tool is configured to determine that a user of the computing device has used a network resource, identify the network resource, and transmit an identification of the network resource to a server.

11. A system for collecting data in a computing network, the system comprising:
a computing device including a memory and a processor in communication with the memory;
a deployment server in communication with the computing device via the computing network and configured to deploy a collection tool to the computing device;
a collection server in communication with the computing device via the computing network and configured to receive data transmitted from the computing device and store the data in a network storage area;
a database server in communication with the collection server via the computing network and configured to receive a catalog of the data to be transmitted from the computing device;
the collection tool stored in the memory, executable by the processor and configured to:
generate a snapshot of the data,
store the snapshot on the computing device,
generate and communicate, to a database server, a catalog that lists the data included in the snapshot,
determine if the computing device is being actively used by a user throughout a transmission of data from the storage area to a collection server,
transmit the data from the storage area to the collection server at a first rate if it is determined that the computing device is being actively used by a user,
transmit the data from the storage area to the collection server at a second rate if it is determined that the computing device is not being actively used by a user, wherein the second rate is greater than the first rate,
determine that collection of the data is complete by verifying that data in the catalog has been marked as either collected or manually excused from collection,
transmit a collection complete message to the computing device, and
in response to receiving the collection complete message, automatically uninstall the collection tool from the computing device.

12. The system of claim 11, wherein the collection tool is configured to generate a snapshot of the data, store the snapshot on the computing device, and transmit the data from the snapshot without substantially affecting an ability of a user to use the computing device and interact with the data.

13. The system of claim 11, further comprising a case management server providing a user interface through which identifying information about the computing device may be entered and the collection process may be observed and managed.

14. The system of claim 11, wherein the deployment server and the collection server are combined into a single device.

15. The system of claim 11, further comprising an Internet Protocol (IP) address lookup tool configured to run on the deployment server and determine an IP address of the computing device.

16. The system of claim 11, wherein the collection server is configured to transmit to the database server updated status information regarding the transmission of the data included in the snapshot.

17. The system of claim 11, further comprising a landing zone configured to store temporarily and stage the data as the data is received by the collection server.

18. The system of claim 11, wherein the collection tool is configured to employ a security tool configured to prevent a user of the computing device from accessing or editing the snapshot.

19. The system of claim 11, further comprising a network storage device configured to permanently store the data.

20. The system of claim 11, wherein the collection server is configured to temporarily store the data in a landing zone as the data is transmitted to the collection server, and transmit the data to a network storage device after a determination is made that the collection is complete.

21. A computer program product for collecting data stored on a computing device, the computer program product comprising a non-transitory computer readable medium having computer readable program instructions stored therein, wherein said computer readable program instructions comprise:
first instructions configured for generating a snapshot of the data stored on the computing device;
second instructions configured for storing the snapshot on the computing device;
third instructions for generating a catalog that lists the data included in the snapshot and initiating communication of the catalog to a database server;
fourth instructions configured for continuously determining if the computing device is being actively used by a user throughout a transmission of the data from the computing device to a collection server, transmitting the data from the computing device to the collection server at a first rate if it is determined that the computing device is being actively used by a user and transmitting the data from the computing device to the collection server at a second rate if it is determined that the computing device is not being actively used by a user, wherein the second rate is greater than the first rate;
fifth instructions configured for determining that collection of the data is complete by verifying that data in the catalog has been marked as either collected or manually excused from collection;

sixth instructions configured for transmitting a collection complete message to the computing device; and seventh instructions configured for, in response to receiving the collection complete message, automatically uninstalling the collection tool from the computing device.

22. The computer program product of claim 21, wherein the computer program product is configured such that the first, second and fourth instructions are capable of being executed without substantially affecting a user's ability to use the computing device and interact with the data stored on the computing device.

23. The computer program product of claim 21, further comprising:

eighth instructions configured for updating the catalog as the data is transmitted to the remote collection server to reflect a status of the data.

24. The computer program product of claim 23, further comprising:

ninth instructions configured for utilizing the catalog to resume transmission of the data included in the snapshot to the remote collection server at a point of interruption in an event transmission is interrupted.

25. The computer program product of claim 21, further comprising:

eighth instructions configured for preventing a user of the computing device from accessing or editing the snapshot.

26. The computer program product of claim 21, further comprising:

eighth instructions configured for identifying a network resource used by a user of the computing device; and ninth instructions configured for transmitting identification of the network resource to a server.

\* \* \* \* \*